United States Patent
Kehe

(10) Patent No.: US 6,497,337 B1
(45) Date of Patent: Dec. 24, 2002

(54) COMPOSITION AND METHOD FOR PROMOTING ADHESION OF THERMOPLASTIC ELASTOMERS TO METAL SUBSTRATES

(75) Inventor: Alfred William Kehe, Valparaiso, IN (US)

(73) Assignee: White Cap, Inc., Downers Grove, IL (US)

( * ) Notice: Subject to any disclaimer, the term of this patent is extended or adjusted under 35 U.S.C. 154(b) by 1608 days.

(21) Appl. No.: 08/739,503

(22) Filed: Oct. 28, 1996

Related U.S. Application Data

(63) Continuation of application No. 08/462,051, filed on Jun. 5, 1995, now abandoned, which is a continuation of application No. 08/067,565, filed on May 26, 1993, now abandoned.

(51) Int. Cl.$^7$ .............................. B65D 53/00; C09J 5/02
(52) U.S. Cl. .................... 220/378; 156/330; 156/307.5; 220/378; 523/436; 524/364; 525/65; 525/109
(58) Field of Search .............................. 156/307.5, 330; 525/65, 109; 524/364; 523/436; 220/378

(56) References Cited

U.S. PATENT DOCUMENTS

| | | | |
|---|---|---|---|
| 3,030,332 A | * | 4/1962 | Lombardi et al. .......... 525/109 |
| 3,650,809 A | | 3/1972 | Gilliam et al. |
| 3,944,511 A | | 3/1976 | Taylor |
| 4,012,270 A | * | 3/1977 | Fitko ........................... 525/65 |
| 4,032,492 A | | 6/1977 | Englund et al. |
| 4,034,132 A | | 7/1977 | Manuel |
| 4,085,186 A | | 4/1978 | Rainer |
| 4,130,213 A | | 12/1978 | Wszolek |
| 4,232,086 A | * | 11/1980 | Mori et al. .................. 156/330 |
| 4,345,004 A | | 8/1982 | Miyata et al. |
| 4,438,162 A | | 3/1984 | Nelson |
| 4,478,667 A | | 10/1984 | Fitko |
| 4,500,021 A | * | 2/1985 | Bildusas ...................... 156/344 |
| 4,812,513 A | * | 3/1989 | Hirose .......................... 525/65 |
| 4,852,754 A | * | 8/1989 | Holdsworth et al. ......... 428/349 |

* cited by examiner

*Primary Examiner*—John J. Gallagher
(74) *Attorney, Agent, or Firm*—Cook, Alex, McFarron, Manzo, Cummings & Mehler, Ltd.

(57) ABSTRACT

Adhesion of shaped thermoplastic elastomer articles is promoted without the need for special primers or other supplemental resin additives by incorporating in an enamel coating composition, an adhesion promoting amount of a carboxyl-modified poly (alpha-olefin) polymer resin. In accordance with a preferred embodiment, the enamel coating composition is a corrosion-resistant cresol-formaldehyde/epoxy resin coating containing from about 0.1% to about 3% by weight of a maleic anhydride-modified polypropylene resin adhesion promoter. The compositions and bonding methods described are useful to provide bonded structures of shaped thermoplastic elastomers, such as SEBS, PBR and EPDM copolymers, heat sealed to metallic substrates, especially metal closures for food containers destined for exposure to high temperature filling, sterilization and retort processing conditions.

12 Claims, No Drawings

COMPOSITION AND METHOD FOR PROMOTING ADHESION OF THERMOPLASTIC ELASTOMERS TO METAL SUBSTRATES

This application is a continuation, of application Ser. No. 08/462,051, filed Jun. 5, 1995 which is a continuation of Ser. No. 08/067,565 filed May 26, 1993, both now abandoned.

BACKGROUND OF THE INVENTION

The present invention relates to compositions for promoting the bonding of shaped thermoplastic elastomer articles to metallic substrates. More particularly, it relates to metallic food container closures specially adapted for use in high temperature filling, sterilization, and retort processing environments, including firmly adherent thermoplastic elastomer sealing gaskets or liners.

Vessel closures for use in food containers include a closure shell formed of either metal or plastic provided with a liner or gasket on the inner facing surface of the closure shell. The liner or gasket provides an hermetic seal between the closure member and the vessel opening. In the past, poly(vinyl chloride)-based liner formulations have been used to provide closure seals. The use of poly(vinyl chloride) resin-based compound liners is currently being discouraged for a number of reasons.

Recently, poly(vinyl chloride) (PVC) resins have received adverse EPA publicity, due to incineration, land fill, and recyclability concerns. PVC resin based plastisols conventionally employed as the closure gasket or liners, now interfere with the recyclability of both the plastic closure shell and the thermoplastic polyester bottle or container.

To overcome the shortcomings with prior art PVC-based liners and gaskets, a search is currently underway to provide substitute non-PVC type liner materials. Early efforts have focused on hot melt compositions, such as those described in U.S. Pat. Nos. 4,032,492 and 4,085,186. The compositions proposed include rubbery block copolymers based on styrene and butylene or ethyl vinyl acetate copolymers employed in combination with low molecular weight hydrocarbon oils, waxes, plasticizers, and other additives. The hot melt formulations generally possess low melting or softening points ranging from 70° to 125° C. In some food processing and packaging environments and applications, hot filling and pasteurization conditions are frequently carried out at temperatures above 70° to 125° C. Moreover, in hot fill, high retort food filling operations, in addition to elevated temperatures, internal vacuums of as high as 15–26 inches of mercury (Hg) are realized, which cause problems for low temperature softening sealing or gasketing materials. The proposed hot melt compositions generally cannot maintain the compressive set values and cut-through resistance values necessary to provide satisfactory hermetic seals under these high temperature processing conditions.

An additional requirement for liner and gasketing compositions is that they must possess good to excellent adhesion to the closure substrate to minimize the gasket or compound liner movement and cut through during hot fill and retort conditioning. The maintenance of hermetic seals during processing, case packing, shipping, and prolonged storage periods are all essential to successful food packaging.

More recently, it has been proposed to employ thermoplastic elastomer products to provide hermetic sealing structures for various plastic or metallic food vessel closures. Thermoplastic elastomers are thermo-plastic processable polymer materials possessing easy processability and rubbery mechanical performance characteristics. Thermoplastic elastomers, often referred to as TPEs, possess a number of processing advantages over earlier rubber materials because thermoplastic elastomers may be extruded and molded to shape and used with little or no extra compounding, vulcanization, or heating steps and the recycling of scrap and the ability to use common plastics processing tools and methods is a distinct advantage. Thermoplastic elastomers possess satisfactory high temperature rubbery performance characteristics to be used as liner gaskets for food closures. However, they are difficult to satisfactorily bond to metal closure materials. For this reason, they have not been readily employed.

Another effort at providing non-PVC based liner and gasketing formulations has been to employ polypropylene polymers and copolymers as the liner compound or gasketing material. Adhesion of the polypropylene liner materials to metal substrates and polymer substrates also ran into some early difficulties. For example, in U.S. Pat. No. 4,034,132, it is disclosed that the adhesion of a propylene polymer to an enamel-coated metal surface such as is provided on a foil pull tab on a container opening is improved by incorporating an adhesion-promoting amount of a carboxyl modified polypropylene resin in the metal coating enamel. In U.S. Pat. No. 4,478,677, it is disclosed that the adhesion of a heat-sealed polypropylene lined aluminum foil pull tab tape strip to an enamel coated metallic surface and opening, provided with an enamel coating formulation based on an epoxy resin, an aminoplast resin and a carboxylated polypropylene resin is further improved and made satisfactory by the addition of a butene polymer, such as polyisobutylene, into the enamel coating composition prior to its application to the metal surface.

Other efforts more directly related to bonding thermoplastic elastomer gasketing materials to metal or plastic closures are described in U.S. Pat. No. 5,060,818 wherein adhesion of the TPE gasket to the closure is promoted by incorporating a low temperature melting point liquid paraffin resin and a polypropylene resin into a thermoplastic elastomer formulation prior to injection molding or shaping the elastomer for placement in the vessel closure. Paraffin-modified formulations may be suitable for low temperature packaging operations but they generally cannot be used in high temperature processing conditions because paraffin softens at temperatures of about 250° F.

In addition to modifying the thermoplastic elastomer compositions per se, prior to molding or shaping to form the gasket or liner, U.S. Pat. No. 5,060,818 additionally states that if an epoxy phenolic type coating is applied to the surfaces of a metallic closure, the bonding of the liner to the inner side of the vessel closure may be promoted by applying a separate layer of an adhesive which contains an oxidized polyethylene resin or an acid modified olefin resin including a carboxyl modified polypropylene resin.

Unexpectedly, in view of the foregoing, it has now been discovered that the adhesion of shaped thermoplastic elastomer articles to metallic substrates is effectively improved by the addition of a carboxyl modified polypropylene resin adhesion promoter to an enamel coating composition without the need to modify the thermoplastic elastomer composition. In addition, it has been discovered that the enamel coating composition may be modified without the need for additional polyisobutylene or polybutene resin additives. Moreover, incorporating the carboxylated polypropylene adhesion promoter for TPE materials into the enamel coating composition avoids the need to apply a separate adhesive layer comprising the carboxylated polypropylene resin in order to obtain satisfactory adhesion of TPE materials.

In accordance with this invention, and to overcome the shortcomings of the prior art arrangements, it is an object of the present invention to provide lidded, stoppered, threaded, capped, or lined metallic closures for vacuum or pressure type products requiring low orders of gas or liquid permeation with a functional hermetic seal.

It is another object of the invention to provide metallic closures provided with liner structures capable of maintaining a hermetic seal under vacuum pressure, pasteurization, hot fill, and retort processing conditions.

It is a further object of the invention to provide new and improved gasketed closures which avoid the use of PVC-based materials.

It is still another object of the invention to provide closures with non-PVC based extrusion or injection processable thermoplastic elastomers which do not require post-vulcanization to impart functional hermetic sealing closure gaskets under pasteurization and sterilization conditions.

It is a further object of the present invention to provide thermoplastic elastomer-lined metallic closures exhibiting functional torque release properties.

It is still a further object of the present invention to provide metallic closures with a heat activatable enamel coating which not only promotes adhesion of functional, non-PVC based liner and gasket materials, but also provides a metallic closure exhibiting excellent product and corrosion resistance when subjected to pasteurization, sterilization, and prolonged room temperature storage conditions.

SUMMARY OF THE INVENTION

In accordance with these and other objects, the present invention provides a new and improved enamel coating composition for promoting adhesion of shaped thermoplastic elastomer articles to metallic substrates.

In accordance with this invention, the new and improved enamel coating composition comprises a solids mixture, including: (a) from about 30% to about 90% by weight of an epoxy resin; (b) from about 10% to about 70% by weight of a phenol-formaldehyde resin cross linker; and (c) from about 0.1% to about 3% by weight of a carboxyl-modified alpha-olefin polymer resin.

In accordance with an alternate aspect, the present invention additionally provides a new and improved method of bonding a shaped thermoplastic elastomer article to a metallic surface which comprises: applying an enamel coating to a metal surface of a substrate, said enamel coating containing a solids mixture of from about 30% to about 90% by weight of an epoxy resin, from about 10% to about 70% by weight of a phenol-formaldehyde resin, and from about 0.1% to about 3% by weight of a carboxyl-modified alpha-olefin polymer resin; baking the enamel coated substrate at an elevated temperature for a time sufficient to cure and harden the enamel coating composition; heat sealing a shaped thermoplastic elastomer article to the cured enamel coated metal surface; and thereafter, permitting the heat sealed assembly to cool to ambient temperatures.

In accordance with the preferred embodiment, a new and improved liner-provided vessel closure comprises a metallic vessel closure shell having an outer facing surface and an inner facing surface. The inner facing surface includes a cured enamel coating thereon comprising a cresol-formaldehyde/epoxy resin enamel coating composition and an adhesion-promoting amount of a carboxyl-modified polypropylene resin. A shaped thermoplastic elastomer liner member, which preferably comprises a styrene-ethylene-butylene-styrene block copolymer resin, is firmly adhered to said enamel coated inner surface.

In accordance with this invention, a thermoplastic elastomer article is heat sealed to a metal surface coated with an enamel coating having incorporated therein an adhesion promoting amount of a carboxyl modified polypropylene resin. The method of the present invention eliminates the need to provide additional adhesive layers interposed between the enamel coated metal substrate and the thermoplastic elastomer. It is also avoids the need to modify the thermoplastic material prior to the heat sealing step. Moreover, the present method further provides a heat curable enamel coating composition which avoids the need for added butene polymer or other resinous components.

The new and improved enamel coating formulations and metallic closures incorporating them in accordance with this invention are less expensive to produce and use than prior art compositions. In accordance with this invention, non-PVC lined metallic closures including TPE-type gaskets exhibiting very satisfactory adhesion to the metallic closure substrates are provided.

Other objects and advantages of the present will become apparent from the following Detailed Description and illustrative working Examples.

DETAILED DESCRIPTION OF THE INVENTION

The enamel coating compositions used in the practice of the present invention are generally epoxy resin coating formulations containing a heat activatable cross-linking resin in which small amounts of a bond promoting carboxylated polypropylene resin have been incorporated.

Epoxy resins used in the preparation of the enamel coating formulation are the polymeric reaction products of polyfunctional halohydrins with polyhydric phenols having the structural formula:

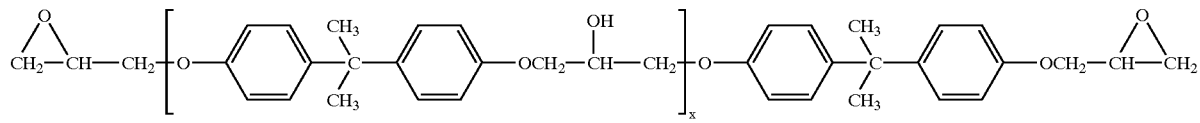

wherein X represents the number of molecules condensed. Typical polyfunctional halohydrins are epichlorohydrin, glycerol, dichlorohydrin, and the like. Typical polyhydric phenols are resorcinol and 2,2-bis(4-hydroxyphenyl) alkanes, the latter resulting from the condensation of phenols with aldehydes and ketones, including formaldehyde, acetaldehyde, propionaldehyde, acetone, methyl ethyl ketone and the like, which result in such compounds as 2,2-bis (4-hydroxyphenyl) propane and like compounds. These epoxy resins normally contain terminal epoxy groups but may contain terminal epoxy groups and terminal hydroxyl groups.

The molecular weight of the epoxy resins may be controlled by the relative proportions of the reactants as well as by the extent to which the reaction is carried out.

In the present invention, those epoxy resins which are of relatively high molecular weight are utilized in preparing the enamel coatings. Generally, epoxy resins having an average molecular weight in the range of 1400 to 6000 may be used. Preferred resins being the condensation products of epichlorohydrin and Bisphenol A, i.e., 2,2-bis(4-hydroxyphenyl) propane.

Epoxy resins are available commercially. Preferred examples are EPON® 1004 and EPON® 1007, products of Shell Chemical Company which are the condensation products of epichlorohydrin and Bisphenol A. For maximum corrosion resistance, high molecular weight epoxy resins sold commercially under the tradename EPI-REZ®565 by Celanese Corporation is especially preferred.

The heat activatable cross-linker resin component for the epoxy resin may be any resin having a polar group which is reactive with the epoxy group, for example a hydroxyl, amino or carboxyl group. For example, phenol/formaldehyde resins, urea/formaldehyde resins, melamine/formaldehyde resins, polar group-containing vinyl resins and polar group-containing acrylic resins may be used singly or in combination.

Of these curing agent resins, the phenol/formaldehyde resins, particularly cresol/aldehyde resins, containing a polynuclear polyhydric phenol are particularly preferred from the standpoint of adhesion to the substrate, barrier properties with respect to corrosive components, and processing resistance.

The phenol/aldehyde resin component (b) used may be any phenol/aldehyde resin which contains a polynuclear phenol in the resin skeleton.

In the present invention, the term "polynuclear phenol" denotes a phenol having a plurality of rings in which the phenolic hydroxyl groups are bonded. Typical examples of the polynuclear phenols are dihydric phenols represented by the formula:

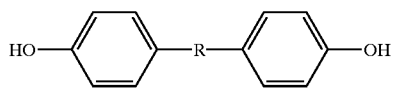

wherein R represents a direct bond or a divalent bridging group. Such phenols are used conveniently for the purpose of this invention. In the dihydric phenols of formula (II), examples of the divalent bridging group R are alkylene groups of the formula —CR$^1$R$^2$— (in which each of R$^1$ and R$^2$ is a hydrogen atom, a halogen atom, an alkyl group having not more than 4 carbon atoms, or a perhaloalkyl group), —O—, —S—, —SO—, —SO$_2$— and groups of the formula —NR$^3$ (in which R$^3$ is a hydrogen atom or an alkyl group having not more than 4 carbon atoms). Generally, R is preferably an alkylene group or an ether group. Suitable examples of such dihydric phenols are 2,2-bis (4-hydroxyphenyl) propane (bisphenol A), 2,2-bis (4-hydroxyphenyl) butane (bisphenol B), 1,1-bis(4-hydroxyphenyl)ethane, bis(4-hydroxyphenyl)methane (bisphenol F), 4-hydroxyphenyl ether, and p-(4-hydroxy) phenol. Bisphenol A and bisphenol B are most preferred.

The polyhydric phenol, either alone or in combination with another phenol, is condensed with formaldehyde to give a phenol/aldehyde resin. Monohydric phenols heretofore used in the production of resins of this type can all be used as a mixture of phenols. Generally, difunctional phenols of the following formula:

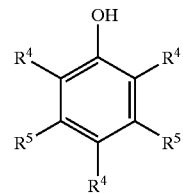

wherein R$^4$ is a hydrogen atom or an alkyl or alkoxy group having not more than 4 carbon atoms, two of the three R$^4$'s are hydrogen atom, and one is an alkyl or alkoxy group, and R$^5$ is a hydrogen atom or an alkyl group having not more than 4 carbon atoms, are preferred. Other phenols such as o-cresol, p-cresol, p-t-butylphenol, p-ethylphenol, 2,3-xylenol and 2,5-xylenol, singly or in combination of two or more, are most preferred. Of course, other phenols such as phenol (carbolic acid), m-cresol, m-ethylphenol, 3,5-xylenol, m-methoxyphenol, 2,4-xylenol and 2,6-xylenol may be used, as well as other difunctional phenols such as p-aminophenol, p-nonylphenol, p-phenylphenol and p-cyclohexylphenol, all of which may be used alone or in combination with the above-mentioned polynuclear phenols in the production of the phenol/aldehyde resins.

The amount of the polynuclear phenol in the phenol/aldehyde resin may be at least 10% by weight, especially at least 30% by weight, based on the entire phenol components. A combination of the polynuclear phenol (a) and the other phenols (b) in a (a):(b) weight ratio of from 98:2 to 65:35, particularly from 95:5 to 75:25, is advantageous in regard to retorting resistance.

Formaldehyde (or paraformaldehyde) is especially suitable as the aldehyde component of the phenol/aldehyde resin. Other aldehydes such as acetaldehyde, butyraldehyde and benzaldehyde may be used singly or in combination with formaldehyde. The phenol/formaldehyde resin used in this invention may be obtained by reacting the aforesaid phenol(s) and aldehyde in the presence of a basic catalyst. The amount of the aldehyde used relative to the phenol is not particularly limited, and may be any proportion generally used in the prior art. For example, the aldehyde is used in an amount of at least 1 mole, preferably 1.5 to 3.0 moles, per mole of the phenol. Even if the aldehyde is used in a proportion of less than 1 mole, no particular inconvenience is caused.

Generally, it is desirable to carry out the condensation in a suitable reaction medium, particularly an aqueous medium. Any of basic catalysts previously used for the production of phenol-formaldehyde type resins may be used as the basic catalyst and ammonia is preferred. The basic catalyst may be present in a catalytic amount, especially 0.01 to 0.5 mole %, in the reaction medium. There is no particular restriction on the condensation conditions, and generally, condensation may be effected by heating the reactants at a temperature of 80° to 130° C. for a period of about 1 to 10 hours.

The resulting resin may be purified by known means. For example, the reaction product is extracted and separated from the reaction medium by using a ketone, an alcohol, a hydrocarbon or a mixture thereof, and as required, washed with water to remove the unreacted compounds. Water is removed by azeotropic distillation or sedimentation. Thus, a phenol/aldehyde resin in a form miscible with the epoxy resin can be obtained.

The epoxy resin component (a) and the phenol/aldehyde resin component (b) may be used in any desired proportions, and there is no particular restriction. From the viewpoint of the retorting resistance of the coated film, it is desirable to use a paint or enamel coating including components (a) and (b) in a weight ratio of from 90:10 to 10:90, especially from 90:10 to 70:30, respectively, for forming the inside protective coating.

The carboxylated polypropylene resin which is utilized in the practice of the present invention is prepared by grafting an unsaturated dicarboxylic acid or anhydride onto an alpha-olefin backbone)using high energy radiation or a peroxy catalyst as described in British Patent 1,020,740. Unsaturated dicarboxylic acids or anhydrides which can be employed to prepare the carboxyl modified polypropylene resins include maleic, tetrahydrophthalic, fumaric, itaconic, nadic, and methylnadic acids as well as their anhydrides, (maleic anhydride being preferred.

The amount of unsaturated dicarboxylic acid or anhydride which can be grafted onto the poly(alpha olefin) backbone ranges from about 0.05 to about 10% by weight based on the total weight of the grafted polymer and preferably the amount of grafted dicarboxylic acid or anhydride ranges from about 0.1 to about 5.0%.

Carboxyl-modified polypropylene resins are preferred as the adhesion-promoting adjuvant for the present enamel coatings. The modified polypropylene resin can be of any particle size and generally has a particle size of 0.05 to 50 microns and preferably a particle size of 35 to 40 microns.

The solids content of the enamel coating compositions of the present invention are comprised of about 70 to about 90% by weight of the epoxy resin, preferably about 75 to about 85% by weight, and about 10% to about 30% of the phenol or substituted phenolformaldehyde resin, especially preferably a cresolformaldehyde resin in an amount of about 10 to 15% by weight of the resin coating, and about 0.05 to 5% by weight of the carboxyl-modified poly(alpha olefin) resin, preferably about 1.0 to about 3% by weight of the carboxylated polypropylene resin.

In preparing the enamel coating compositions of the present invention, the epoxy resin and the phenolplast resin components are dissolved in a solvent blend, such as a mixture of ketones and aromatic hydrocarbons until these components are completely dissolved.

Suitable ketones which can be employed as solvents for epoxy resin-phenolplast resin based enamel coating formulations include methyl ethyl ketone, methyl isobutyl ketone, isophorone, cyclohexanone, diacetone alcohol and diisobutyl ketone. Aromatic hydrocarbon solvents useful as solvents for the epoxy-phenolplast resin based enamel coating formulations include benzene, toluene, xylene, and commercially available aromatic naphtha mixtures, such as Solvesso 100 or 150. An example of a useful ether alcohol is butyl cellosolve and an example of a useful ether alcohol ester is cellosolve acetate.

Antioxidants and thermal stabilizers may also be incorporated in the epoxy resin-phenolplast resin formulation to inhibit oxidation of the carboxyl modified polypropylene resin during the baking and curing of the enamel coating after its application to metal surfaces. Antioxidant compounds which have been found useful in the practice of the present invention include hindered phenolic compounds such as Irganox 1010®, tetrakis[methylene-3-(3,5-di-t-butyl-4-hydroxyphenyl) propionate] methane, which are incorporated in the enamel coating formulations at concentrations in the range of about 0.1 to 1.0 percent by weight based on the solids content of the enamel. Lubricants, such as low molecular weight polyethylene dispersions, which are required during forming steps in container end closure manufacture may also be incorporated in the enamel composition.

Following the procedure of U.S. Pat. No. 4,478,667, the carboxylated polypropylene resin is preferably first dissolved in a hot, e.g., greater than 100° C., organic solvent selected from aliphatic alcohols, acids and hydrocarbons containing at least 10 carbon atoms.

The carboxylated polypropylene resin is added to the organic alcohol, acid or hydrocarbon solvent at a concentration of about 1 to about 30 percent by weight and preferably about 2 to about 10 percent by weight. After the resin is added to the solvent, the mixture is heated to a temperature above 100° C. until the resin completely dissolves in the solvent. The carboxylated polypropylene resin solution is then added to the epoxy/phenolplast resin formulation to prepare the enamel coating composition.

Preferably the carboxylated polypropylene is at temperature above 100° C. when added to the enamel coating formulations.

Organic alcohols used to prepare solutions of the carboxylated polypropylene resin for incorporation in the epoxy-phenolplast resin formulations to prepare the enamel coating formulations of present inventions are long chain, saturated and unsaturated, aliphatic monohydroxy alcohols having the general formula R—OH where R is a straight or branched chained saturated or ethylenically unsaturated hydrocarbon group having from 10 to 30 carbon atoms and preferably from 12 to 22 carbon atoms. Illustrative alcohols are decyl alcohol, tridecyl alcohol, lauryl alcohol, tetradecyl alcohol, cetyl alcohol, oleyl alcohol, linoleyl alcohol, palmitoyl alcohol, arachidyl alcohol, stearyl alcohol, benhenyl alcohol, arachidonyl alcohol, myristoyl alcohol and mixtures of these alcohols.

Organic acids which may be used as solvents for the carboxylated polypropylene resin include saturated and ethylenically unsaturated aliphatic acids having 10 or more carbon atoms and preferably 12 to 22 carbon atoms such as the fatty acids as capric acid, lauric acid, myristic acid, palmitic acid, isostearic acid, stearic acid and arachidic acid, undecylenic acid, myristoleic acid, palmitoleic acid, oleic acid, cetoleic acid and uric acid and mixtures of these acids.

Aliphatic hydrocarbons having 10 or more carbon atoms which may be used as solvents for the carboxylated polypropylene resin include saturated hydrocarbons such as kerosene and mineral oil as well as unsaturated hydrocarbons and particularly unsaturated hydrocarbons having olefinic or ethylenic unsaturation such as undecene, tridecene and pentadecene.

The enamel compositions of this invention can be satisfactorily applied at a solids content ranging from about 20 percent to about 70 percent by weight, based on the total weight of the liquid enamel coating composition. Generally, a solids content of 30 to 50 percent by weight is preferred.

The enamel coating composition of the present invention can be satisfactorily applied by any of the conventional methods employed in the coating industry. However, for coating of sheet metal used in container manufacture, gravure or direct roller coating are preferred methods, as the desired coating weight is easily and conventionally applied in a single coat. Spraying, dipping and flow coating are also useful methods of applying the coating dispersion.

After applying the enamel coating, it is cured and hardened by heating the coated substrate at a temperature of about 350° F. to about 500° F. for a period of about 20 minutes to about 1 minute, the preferred conditions being 8–10 minutes at about 375° F.

The preferred coating weight for coating metal closures is in the range of 1.0 to 6.0 milligrams of dry coating per square inch of substrate surface to provide an enamel surface to which the TPE shaped articles may be heat sealed.

The thermoplastic elastomer materials useful for forming the shaped gaskets or liners heat sealed to the enamel coated metallic closure surfaces in accordance with this invention included alloyed blends of rubbery copolymers finely dispersed in a matrix of polyolefin as a continuous phase. Illustrative alloyed blends include a polypropylene matrix including ethylene-propylene elastomers, prevulcanized butyl rubber, sold commercially under the tradename Trefsin® from Monsanto Company, ethylene-propylene-dicyclopentadiene rubber (EPDM) sold commercially under the tradenames Vistaflex® and Santoprene® from Monsanto. Other thermoplastic elastomers may include rubbery block copolymers such as triblock copolymers of the general formula ABA, where B is an elastomeric segment and A is a thermoplastic segment, and radial block copolymers of the type having a central hub and a plurality of copolymer chains emanating therefrom having the general formula AB, where B is an elastomeric segment and is attached to the hub, and A is a thermoplastic outer segment, are useable.

These copolymers are characterized by rubber-like properties similar to those of conventional rubber vulcanizates and flow properties similar to thermoplastics at temperatures above the glass transition temperature of the end blocks. The melt behavior of these compounds, with respect to shear and temperature, is similar to the behavior of conventional thermoplastics, but melt viscosities are very much higher than those of either homopolymer of the same molecular weight. Such block copolymers have been shown to exhibit a structure wherein the elastomeric and thermoplastic segments exist in separate phases. As long as the temperature is maintained below the softening point of the thermoplastic blocks, the molecules remain pinned at each end by association of the thermoplastic segments into "domains" which are connected by flexible elastomeric chains. Thus, an elastomeric network is formed with physical cross-links in the place of the chemical cross-links of vulcanizates. When heated above the glass transition temperature of the thermoplastic segments, the domains are broken up and the polymers soften and flow.

In principle, A can be any polymer normally regarded as thermoplastic, e.g. polystyrene, polymethyl methacrylate, polypropylene, etc., and B can be any polymer normally regarded as elastomeric, e.g. polyisoprene, polybutadiene, polyisobutylene, polyethylene-butylene, EPDM, etc. In addition to the choice of the blocks, two other parameters influence the physical behavior of these compounds; total molecular weight, and the relative proportion of the two types of segments present and the mechanical properties of the two types of segments present. The mechanical properties of such block copolymers are essentially unaffected by molecular weight changes, however, the viscosities are quite sensitive to total molecular weight changes and this sensitivity is particularly apparent at low shear rates. Since none of these block copolymers exhibit Newtonian viscosity behavior, it is not possible to disclose the range of viscosities of compositions useful in the process of the invention in conventional viscosity units.

Changes in the relative proportions of the thermoplastic and elastomeric segments significantly influence both the mechanical and the flow properties of these block copolymers. As an example, a triblock copolymer wherein A is polystyrene and B is polybutadiene undergoes the following changes when the percent styrene content is varied. With a 13% styrene content, the polymer behaves like an undercured conventional vulcanizate. On increasing the styrene content to 27.5%, the behavior of the polymer is closer to that of the conventional vulcanizates. At higher styrene contents (30 to 53 percent) the polymers exhibit a yield followed by drawing and then an elastic extension. At even higher styrene content (65%), a very high yield stress is followed by a short draw and immediate break. In addition, as the styrene content is increased, the viscosity of the polymer goes through a pronounced maximum and then decreases.

In the linear triblock copolymers useful in this invention, A, the thermoplastic segment, is preferably a polymerized alkenyl aromatic compound of average molecular weight within the range of about 2,000 to 30,000. Polystyrene is a preferred material, but polymethylstyrene, polyvinyl toluene, polyvinyl naphthalene, and the like may be substituted therefor. B, the elastomeric segment, is preferably a diene polymerized from starting materials selected from the class consisting of conjugated diene hydrocarbon compounds having four to eight carbon atoms. Elastomeric copolymers of ethylene with propylene may also be useful. B is preferably polybutadiene, polyisoprene, or polyethylene-butylene having an average molecular weight per segment within the range of 10,000 to 200,000. The thermoplastic segments should contribute between about 15 and 65 percent of the molecular weight of the triblock molecule, preferably between 20 and 40 percent. Methods of synthesis of triblock compounds of this type are known to those skilled in the art and many compounds of this type are commercially available from Shell Chemical Company under the tradename Kraton®.

Some of these linear triblock copolymers are subject to a degree of thermal degradation when heated to temperatures above about 150° C. in the presence of oxygen. However, this disadvantage can be avoided by heating the copolymers in an inert atmosphere. Thermal degradation is also substantially reduced by incorporating conventional antioxidants in the compositions. The presently preferred triblock copolymers are sold by Shell Chemical Company under the tradename Kraton G. These are characterized by significantly increased thermal stability and comprise between about 20 to 40 percent styrene and a middle block of a copolymer of ethylene with butylene.

Kraton G-2705®, especially preferred, is a thermoplastic rubber available from the Shell Chemical Company. More specifically, it is a linear triblock copolymer with a center elastomeric block of an ethylenebutylene polymer and end block of thermoplastic polystyrene. It supplies rubbery characteristics and film strength to the composition and is more heat resistant than the other triblock molecules.

The preferred TPE materials are also compounded with a torque release improving amount of an unsaturated fatty acid amide. Especially preferred for use as torque release additives are oleylamide and erucylamide added at amounts of 1–5% by weight of the overall TPE composition. Conventional pigments such as $TiO_2$ or fillers such as $CaSO_4$ and fumed silicon dioxide (silica) may also be added in conventional amounts.

In accordance with this invention, the TPE gasket is bonded or formed and bonded to the cured enamel coated metallic substrate surface by high temperature extrusion, intrusion molding, injection molding, compression molding, or pre-formed gaskets may be directly bonded by heat sealing at a temperature range of about 350° to 400° F. Heat sealing may be accomplished by any means known to the art, such as a hot platen press or a metal jaws heated by resistance wire or by induction heating, using dwell times varying from 0.1 seconds to 5 seconds.

After the TPE gasket or liner is heat sealed and bonded to the enamel coated metal surface, the assembly is allowed to cool to ambient temperature.

Further details regarding the compositions and methods and the attendant advantages provided by the present invention will become apparent from the following illustrative working examples.

DETAILED DESCRIPTION OF THE PREFERRED EMBODIMENTS

In the following examples, a new and improved enamel coating composition in accordance with this invention was prepared and coated on a sheet metal substrate. After curing of the coatings, molded samples of shaped thermoplastic elastomers were heat seal bonded to the coated substrate and adhesion between the TPE gasket and coated substrates was evaluated. The test samples were prepared and tested as follows:

PREPARATION 1

A solution of carboxyl-modified alpha-olefin resin was prepared by dissolving a carboxylated (maleic anhydride modified) polypropylene powdered resin, HERCOPRIME®D available from Hercules Incorporated, in hot oleyl alcohol at a temperature of about 160° C. until a heated solution of about 6% by weight solids was obtained.

A basic enamel coating composition including an epoxy resin/cresol formaldehyde coating was obtained containing a solution of about 30% solids in a 50/50 v/v solvent blend of butyl cellosolve and xylol. The epoxy/phenolplast coating included a solids mixture of about 85 parts by weight of the diglycidyl ether of Bisphenol A and about 15 parts by weight of a cresolformaldehyde resin cross-linker.

EXAMPLE 1

The new and improved adhesion promoting enamel coating compositions were prepared by slowly adding the hot alcohol solution of carboxylated polypropylene resin prepared above to the epoxy/phenolplast coating with high speed agitation until an enamel coating composition containing a concentration of about 3% by weight of the carboxylated polypropylene, based on enamel solids is obtained.

Test panels were prepared by applying the enamel coating- composition in laboratory draw-downs on No. 55# 1/4# SN-DR9 tin plated steel panels and curing the test panel at a temperature of about 204° C. for a period of 10 minutes to a dry film weight of about 7.5 mg/4.0 sq.inch.

For purposes of comparison, some test panels were coated and heat cured with the adhesion promoting enamel coating composition in accordance with the method described above. Other test panels were prepared by coating the panel with unmodified epoxy/cresol-formaldehyde coating followed by heat curing. Still other panels were coated with the base epoxy/cresol formaldehyde coating and heat cured, and thereafter, were further treated by applying a draw down primer coating of a dispersion of the carboxylated polypropylene resin in kerosene at 15% solids, followed by drying.

Thermoplastic elastomer sheets were prepared by compounding and extruding an SEBS type copolymer resin, KRATON G 2705® from Shell Chemical Co. and an EPDM-type copolymer resin, SANTOPRENE® 271–64 from Monsanto Corporation with 1% by weight erucylamide. Each of the elastomer formulations were extruded and formed into slabs having a thickness of 0.030" and 0.050".

Test specimens were prepared by cutting the enamel coated test plates in 1"×4" strips and by cutting the elastomer slabs into 1"×4" strips. The end portion of each elastomer strip was heat sealed to the coated metal test strip generally at right angles to provide about one square inch of overlap. Heat sealing was performed by placing the elastomers and coated metal strips in a semi-automatic heat sealing fixture (Sentinel) using only a bottom heating platen at a temperature of about 350° to 400° F. and at line air pressure of from about 40 to about 60 psi for a 1–5 second dwell time, followed by pressing engagement against a central portion of the coated test strip. After cooling, the specimens were clamped in a test fixture and the free end of the elastomer strip was moved crosswise to pull the heat sealed strips apart.

The test specimens prepared which included a carboxylated polypropylene primer coating or which included an adhesion promoting amount of the carboxylated polypropylene resin in the enamel coating composition in accordance with the present invention both showed excellent bond strength and exhibited cohesive-type adhesive failure. The test panels coated with the base epoxy/cresolformaldehyde enamel which did not include any primer layer or adhesion promoter modifier exhibited poor bonding to the elastomers, actually with no adhesion obtained in the absence of primer or modifier.

Further laboratory studies indicated that the primer formulation of the carboxylated polypropylene/kerosene dispersion exhibited very poor transfer properties in laboratory roller coating trials. From this study, it was concluded that a primer dispersion would not be a commercially satisfactory solution to promoting adhesion of TPE gaskets and liners to metallic substrates where commercial roller coating operations and methods are required to be used.

EXAMPLES 2–4

In the following examples, T-peel test specimens were prepared in accordance with the method of Example 1. The coated metal substrates and selected thermoplastic elastomers were heat sealed together and thereafter were tested, in triplicate, for T-peel adhesive strength on Instron test equipment at chart magnification 1× and at a crosshead speed of two inches per minute. Some of the test specimens were exposed to room temperature and others were aged at an elevated temperature of about 212° F. and 250° F. for a period of 20 minutes and 1 hour, respectively. The aging exposure at 212° F. for 20 minutes was chosen to simulate hot fill and sterilization temperatures encountered in commercial food processing environments. The enamel compositions and thermoplastic elastomer gaskets tested and the results obtained are set forth in TABLE 1. As used in the table, SEBS means Kraton G 2705® from Shell Chemical Company; EPDM means Santoprene® 271–64 from Monsanto Company; and PBR means a Trefsin® "TPE 3201" brand propylene-butylene copolymer from Monsanto Company. The primer dispersion used was Morprime 10B from Morton Chemical and the modifier was Hercoprime D from Hercules Incorporated. In the following table the failure mode for the adhesion tests are indicated in parentheses and have the following meanings: (c)=cohesive failure mode, i.e., the test specimen broke in the TPE substrate; (a)= adhesive failure mode wherein bond failed at metal-TPE interface; (a/c)=both a cohesive and an adhesive failure condition; and (N/A)=no adhesion. The test specimens made and the results obtained were as follows:

TABLE 1

T-Peel Adhesion of Thermoplastic Elastomers to Unmodified, Primed and Modified Coated Metallic Substrates

| EXAMPLE: | A | B | C | D | 2 | E | 3 | F | 4 |
|---|---|---|---|---|---|---|---|---|---|
| Composition: | | | | | | | | | |
| Enamel | | | | | | | | | |
| Epoxy/Cresol Formaldehyde Resin Coating | X | X | X | X | X | X | X | X | X |
| Primer Dispersion of Carboxylated Polypropylene in Kerosene | — | — | — | X | — | X | — | X | — |
| Carboxylated Polypropylene Modifier | — | — | — | — | X | — | X | — | X |
| Elastomer | | | | | | | | | |
| SEBS | X | — | — | X | X | — | — | — | — |
| EPDM | — | X | — | — | — | X | X | — | — |
| PBR | — | — | X | — | — | — | — | X | X |
| PROPERTIES: | | | | | | | | | |
| Average T-Peel Adhesive Strength in load/lbs., (Failure Mode) | | | | | | | | | |
| Aging Condition: | | | | | | | | | |
| Room Temp., 77° F. | 0(N/A) | 0(N/A) | 0(N/A) | 14.5(c) | 21.0(a) | 13.8(c) | 15.2(c) | 11.3(c) | 10.7(a/c) |
| 212° F., 20 Minutes | 0(N/A) | 0(N/A) | 0(N/A) | 14.0(c) | 19.0(a) | 6.2(c) | 11.8(a/c) | 12.2(c) | 9.5(a/c) |
| 250° F., 1 Hour | 0(N/A) | 0(N/A) | 0(N/A) | 15.2(c) | 11.3(a/c) | 12.5(c) | 8.7(a/c) | 11.3(c) | 6.8(a/c) |

From the results in TABLE 1, the enamel coating compositions in accordance with this invention shown in Examples 2 and 3 at room temperatures and after aging at 212° F. for 20 minutes, exhibited the highest T-peel adhesion. The primed and coated metallic substrates exemplified in EXAMPLES D, E, and F generally showed better cohesive failure and better high temperature exposure performance. THE PBR thermoplastic elastomer gaskets showed the poorest adhesion, at each aging condition and performed better with the primer coated substrates than with the composition of this invention shown in Example 4. Given the above-mentioned limitation in roller coating performance for the primer coated specimens, the results of TABLE 1 indicated good adhesion-promoting performance for the compositions and laminates made in Examples 2 and 3. In all cases, there was no adhesion without the use of the modifier or primer.

EXAMPLE 5

Corrosion-resistant metal closures lined with firmly-adherent TPE gaskets were prepared as follows:

55# DR-9 1/4# tinplate was first roller coated on the outside face with a crosslinkable butylated urea formaldehyde/epoxy enamel coating as a size coating at a bake temperature of 188° C. for 10 minutes and a dry film weight of 5 mg./4 sq.in.

This outside size face coating was followed by an inside size coating comprising the crosslinkable cresol formaldehyde/epoxy coating (30% solids in a solvent blend of butyl cellosolve and xylol) applied to the tinplate by a roller coater and baked at a temperature of 204° C. for 10 minutes with a dry film weight of 7.5 mg./4 sq.in.

The outside face size coating was then topcoated with a crosslinkable butylated melamine formaldehyde/epoxy ester enamel with a bake temperature of 185° C. for 10 minutes and a dry film weight of 10 mg./4 sq.in.

The last roller coating operation involved the inside topcoat heat sealable enamel comprising the cresol formaldehyde/epoxy/carboxylated polypropylene coating which was baked at 195° C. for 10 minutes and a dry film weight of 12 mg/4 sq.in.

The coated tinplate sheets were then wax lubricated, cut into scroll sheets, and then fabricated into shells which were then hemmed and lugged into closures. In order to inhibit oxidation of the carboxyl modified polypropylene resin during the baking of the enamel coating after its application to coated and uncoated metal surfaces, antioxidants or thermal stabilizers may be incorporated into the cresol formaldehyde/epoxy/carboxylic modified polypropylene enamel. Antioxidant compounds which have been found useful in the practice of this invention include hindered phenolic compounds such as Irganox 1010, tetrakis [methylene-3-(3,5-di-t-butyl-4-hydroxyphenyl) propionate] methane, which are incorporated in the enamel coating formulation in the range of about 0.1 to 1% by weight based on the solids content of the enamel. The Irganox 1010® (Ciba-Geigy) antioxidant can be pre-dissolved in cellosolve acetate as a 10% solution and then added to the enamel coating.

Lubricants such as polyethylene and/or wax dispersions may also be incorporated into the enamel coating or they may be applied externally onto the coated plate for improved closure fabrication properties.

The carboxylated (maleic anhydride) polypropylene powdered resin is preferably first dissolved into hot 160° C. oleyl alcohol at a concentration of about 6% by weight solids. The hot solution is then slowly added to the cresol formaldehyde/epoxy enamel under high speed agitation at an enamel solids concentration of 3% by weight of the carboxylated polypropylene resins. The enamel composition of this invention can be satisfactorily applied to metal or enameled metal surfaces at a total solids content ranging from about 20 to about 60% by weight of the composition and preferably a solids content of about 25 to 40% by weight is preferred.

The coatings tested were prepared as set forth in TABLE 2, as follows:

TABLE 2

Top Coat Enamel Formulation

| COMPONENT | Gallon (grams) | Solids Content, % | Grams |
|---|---|---|---|
| Cresol-Formaldehyde/ Epoxy Resin Coating | 3000 | 96.6 | 85.3 |
| Carboxylated Polypropylene (0.8% Maleic Anhydride) | 28 | 3.0 | 0.8 |
| Oleyl Alcohol | 450 | — | 12.8 |
| Irganox 1010 ® | 4 | 0.4 | 0.1 |
| Cellosolve | 36 | — | 1.0 |

A 63mm RTO gasket punch was used and about a dozen gaskets were punched out from both the Kraton and Santoprene sheet stocks for trial heat sealing, cap application, and torque evaluations.

The fabricated gaskets were inserted into 63mm RTO shells (not hemmed or lugged) fabricated from 55# 1/4# SN-DR9 plate with an outside coating of specified above and the modified inside coat enamel composition.

The closures were then placed on the semi-automatic heat sealing fixture utilizing only a bottom heated platen at a temperature range of 350° to 400° F., and line air pressure of 50 to 55 psi, and a 2 ½ to 3 second dwell time. Excellent gasket sealing results were obtained with both elastomers. The closures were then hemmed and lugged.

Although the present invention has been described with reference to certain preferred embodiments, modifications or changes may be made therein by those skilled in this art. Although epoxy/cresol-formaldehyde resins are preferred for use herein because they provide good corrosion resistance, other heat curable enamel coating compositions useful for coating metal closures might also be employed. Instead of adding the carboxylated polypropylene in an oleyl alcohol solvent, other solvents may also be used. The adhesion promoting compositions of the present invention may also be used to form other kinds of adhesive joints and bonded articles. All such obvious changes may be made herein without departing from the scope and spirit of the present invention as defined in the appended claims.

What is claimed is:

1. A liner-provided vessel closure comprising a metallic vessel closure shell having an outer-facing surface and an inner facing surface, said inner facing surface including a cured enamel coating thereon comprising a solids mixture of from about 30% to about 90% by weight of an epoxy polymer resin; from about 10% to about 70% by weight of a phenol-formaldehyde resin; and from about 0.1 to about 3.0% by weight of a carboxyl-modified alpha-olefin polymer resin; and a shaped thermoplastic elastomer liner member firmly adhered to said enamel coated inner surface wherein the polymeric component of said liner member consists of a thermoplastic elastomer of styrene-ethylene-butylene-styrene block copolymer resin.

2. A liner-provided vessel closure as defined in claim 1, wherein said carboxyl-modified alpha olefin polymer is a maleic anhydride-modified alpha olefin polymer.

3. A liner-provided vessel closure as defined in claim 2, wherein said carboxyl-modified alpha olefin polymer is a maleic anhydride-modified polypropylene polymer.

4. A liner-provided vessel closure as defined in claim 2, wherein said epoxy polymer resin includes an epoxy-functional polymeric reaction product of at least one epihalohydrin with at least one polyhydric phenol.

5. A liner-provided vessel closure as defined in claim 4, wherein the epoxy polymer resin is a polymeric reaction product of epichlorohydrin and 2,2-bis(4-hydroxyphenyl) propane (Bisphenol-A).

6. A liner-provided vessel closure as defined in claim 1, wherein said phenol-formaldehyde resin is a cresol-formaldehyde resin.

7. A liner-provided vessel closure as defined in claim 1, wherein said enamel coating further includes a heat-stabilizing amount of at least one hindered phenolic antioxidant.

8. A liner-provided vessel closure as defined in claim 7, wherein said hindered phenolic antioxidant is added in an amount of from about 0.1% to about 1.0% by weight, based on solids.

9. A liner-provided vessel closure as defined in claim 7, wherein said hindered phenolic antioxidant is tetrakis methane.

10. A liner-provided vessel closure as defined in claim 3, wherein said maleic anhydride modified polypropylene resin has a carboxyl content of from about 0.6% to about 3.0% by weight carboxyl groups.

11. A liner-provided vessel closure as defined in claim 1, wherein said shaped thermoplastic elastomer liner member further comprises a torque release improving amount of a torque release modifier.

12. A liner-provided vessel closure as defined in claim 11, wherein said torque release modifier is selected from unsaturated fatty acid amide torque release modifiers and is added in an amount of from about 1% to about 5% by weight based upon the weight of the overall thermoplastic elastomer composition.

* * * * *